May 19, 1959  E. P. BECK ET AL  2,887,283
PAY-OFF REEL
Filed June 5, 1956  2 Sheets-Sheet 2
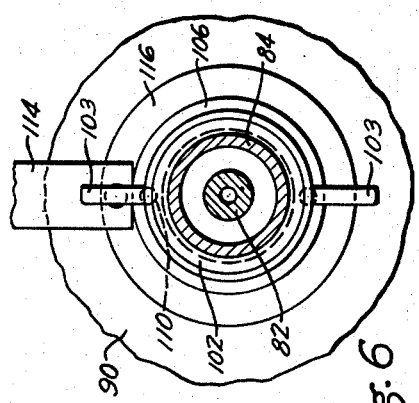
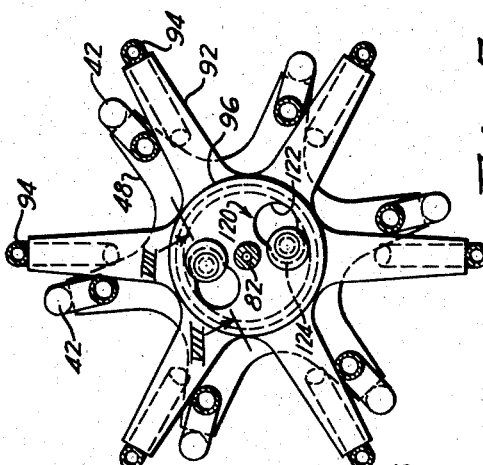
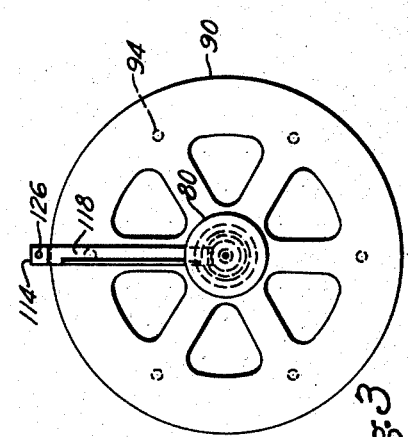
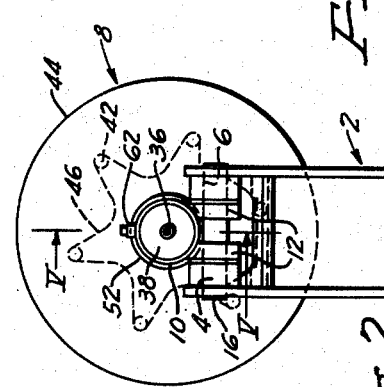
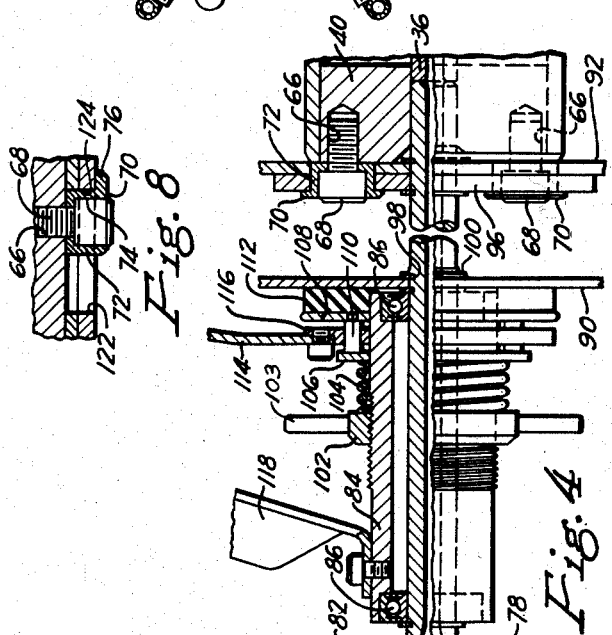
INVENTORS
EUGENE P. BECK
LOWELL C. JEFFERIES
BY ROBERT G. WHITNEY
Donald G. Dalton
THEIR ATTORNEY

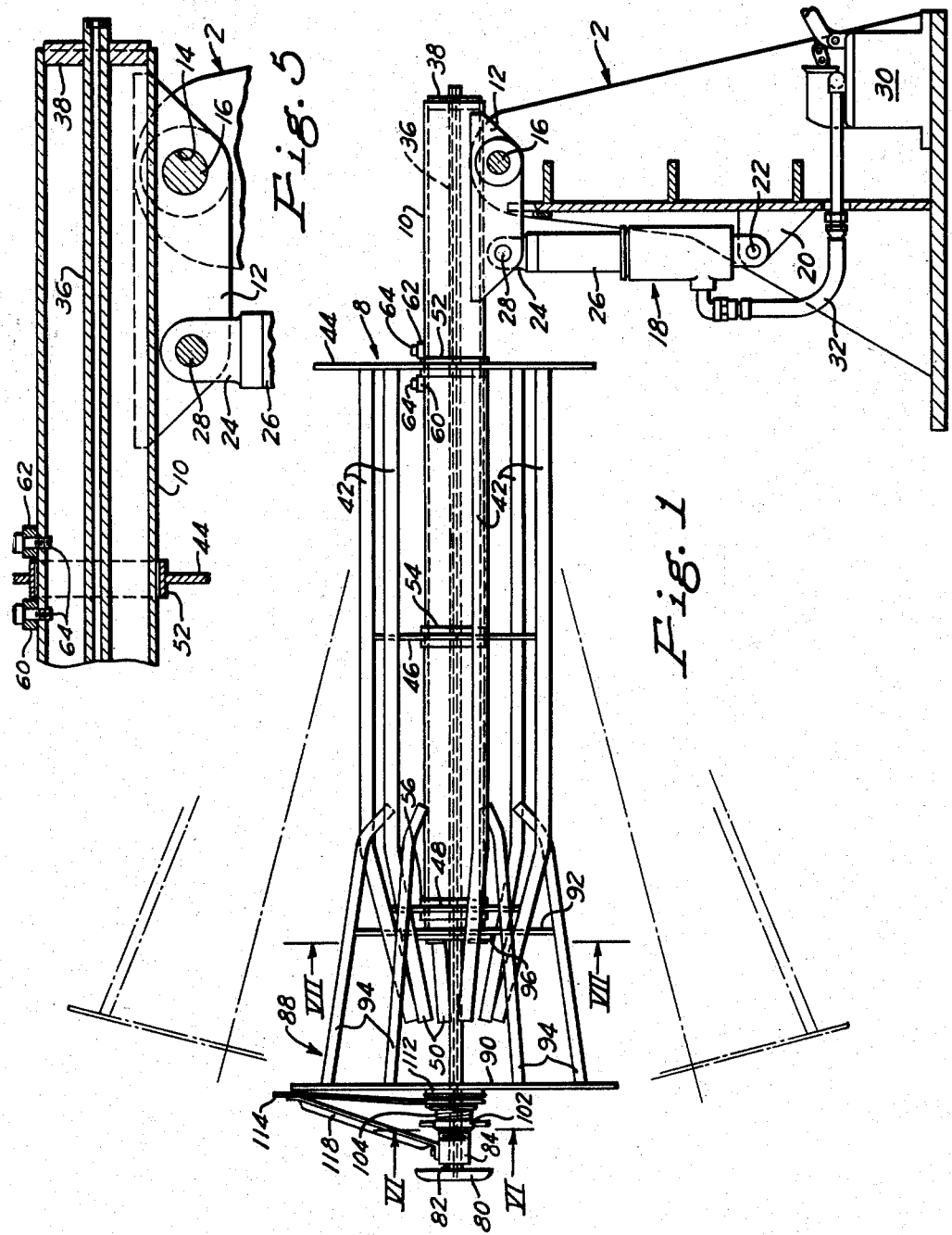

United States Patent Office 2,887,283
Patented May 19, 1959

2,887,283

PAY-OFF REEL

Eugene P. Beck and Lowell C. Jefferies, Antioch, and Robert G. Whitney, Pleasant Hill, Calif., assignors to United States Steel Corporation, a corporation of New Jersey Application June 5, 1956, Serial No. 589,404

3 Claims. (Cl. 242—128)

This invention relates to a pay-off reel and more particularly to a generally horizontal dead pay-off reel for supporting bundles of wire. To our knowledge the reels in use prior to our invention were fixed in a slightly inclined position and had only one size of mandrel or swift. Such reels are difficult to load and cannot be arranged at the best angle for feeding off all sizes of coils. Also, it is necessary to use different sizes of reels when handling a wide range of sizes of coils.

It is therefore an object of our invention to provide a pay-off reel which can pivot in a vertical plane so that it can be adjusted to best loading and unreeling positions.

Another object is to provide such a reel for handling a wide range of sizes of bundles of wire.

These and other objects will be more apparent after referring to the following specification and attached drawings, in which:

Figure 1 is a side elevation of the reel of our invention;

Figure 2 is an end view looking toward the right end of Figure 1;

Figure 3 is an end view looking toward the left end of Figure 1 with the support omitted;

Figure 4 is an enlarged view, partly in section, of a detail of our invention;

Figure 5 is a view taken on the line V—V of Figure 2;

Figure 6 is a view taken on the line VI—VI of Figure 1;

Figure 7 is a view taken on the line VII—VII of Figure 1; and

Figure 8 is a view taken on the line VIII—VIII of Figure 7.

Referring more particularly to the drawings reference numeral 2 indicates a stand or support having spaced ears 4 at its upper end. The ears 4 have aligned axial openings 6 therethrough arranged with their axes horizontal. A mandrel 8 includes a hollow shaft or horn 10 which has spaced brackets 12 at its rearward end. The brackets 12 are received between the ears 4 and have holes 14 therein which are in alignment with the holes 6. A pin 16 passes through the holes 6 and 14 to support the mandrel 8. One end of a hydraulic cylinder and piston arrangement 18 is pivotally mounted on a bracket 20 by means of a pin 22. The bracket 20 is mounted on the stand 2. A clevis 24 mounted on piston rod 26 passes between brackets 12 and is attached thereto by means of a pin 28 which passes through aligned holes in the clevis 24 and brackets 12. A hand operated hydraulic pump 30 is mounted on the stand 2 and is connected to the hydraulic cylinder 18 by means of a flexible conduit 32. The pump 30 includes a needle valve (not shown) for controlling flow of fluid. As best shown in Figures 5 and 6 a wire delivery tube 36 passes through the horn 10 and is supported at its ends by means of collars 38 and 40. Mandrel 8 also includes six spaced apart spokes 42 supported on radial plates 44, 46 and 48. The spokes 42 are generally parallel to the axis of the tube 10 over a substantial part of their length but the ends 50 converge inwardly toward the axis of the tube. The plates 44, 46 and 48 are welded to annular members 52, 54 and 56, respectively. The inside diameters of annular members 52, 54 and 56 are such that they can slide over the tube 10. As best shown in Figure 5 locking bars 60 and 62 bear against opposite sides of the annular member 52. Bars 60 and 62 are held in place by means of cap screws 64 passing through holes in the bars 60 and 62 into threaded holes in the tube 10. The spokes 42 and plates 44, 46 and 48 may be telescoped over the tube 10 to the position shown in Figures 1 and 5 and the bars 60 and 62 held in position by means of cap screws 64, thus locking the spoke assembly from axial movement with respect to tube 10 while permitting rotary movement. When it is necessary to change the outside diameter of the mandrel 8 for different size bundles of wire it is only necessary to remove the bar 60 and slide the spoke assembly to the left. The desired size assembly is then slid back over the tube 10 and bar 60 replaced.

Collar 40 is provided with spaced apart threaded openings 66 for receiving cap screws 68. As best shown in Figures 7 and 8 each of the cap screws 68 is received in a spacer 70 having a cylindrical portion 72 concentric with its axial opening 74 and an eccentric cylindrical portion 76. As best shown in Figure 4 an entry guide 78 is provided with a bell mouth 80 and tubular shaft 82. The end of the shaft 82 removed from the bell mouth 80 is received in the collar 40 and abuts the end of delivery tube 36. A housing 84 surrounds the tubular shaft 82 and is held in spaced relationship therewith by means of bearings 86. An end bell assembly 88 is made up of radial plates 90 and 92 having six spokes 94 extending between and welded thereto. A small diameter plate 96 may also be welded to plate 92 as shown in Figure 4. Plates 90, 92 and 96 have holes therethrough of sufficient diameter to receive the tube 82. Circumferential grooves 98 are provided on the outside surface of tube 82 for receiving locking rings 100 which prevent axial movement of the tube 82 with respect to bearings 86 and plates 90, 92 and 96. The spokes 94 extend radially inwardly from plate 90 beyond plate 92. The housing 84 is threaded to receive a nut 102 having handles 103. A spring 104 surrounds housing 84 and has one end bearing against nut 102 and the other end bearing against spring seat 106 which is attached to brake 108 by means of pins 110. Brake lining 112 is supported between brake 108 and plate 90. A flyer 114 is attached to its supporting bracket 116 which is secured to housing 84. A reinforcing bracket 118 has one end secured to housing 84 and the other end secured to flyer 114. The plates 92 and 96 have diametrically opposed openings 120 therein. The openings 120 have a large diameter portion 122 merging with smaller diameter portion 124, the large diameter portion 122 being such as to receive the eccentric portion 76 of spacer 70 and portion 124 having a diameter only slightly greater than portion 72.

The operation of our device is as follows:

The mandrel 8 is raised to the loading position with its axis extending upwardly toward the left at an angle of about approximately 15° above the horizontal as shown in broken lines in Figure 1. This is done by operating pump 30 to move piston rod 26 upwardly. This causes the mandrel 8 to pivot about pin 16. The needle valve in pump 30 is closed to hold the hydraulic fluid in the cylinder 18, thus preventing the horn from lowering. The flyer unit including the wire guide and the end bell assembly 88 are removed as a unit by turning them counterclockwise. This moves the head portions 76 from a position over hole portions 124 to a position aligned with hole portions 122 so that the entire assembly can be moved to the left. Coils or bundles of wire are then loaded on the tapered end 50, the tie wires are cut and the coils moved to the rear with plate 44 preventing the bundles from moving too far. In passing from the tapered portion 50 to the straight portion of the spokes 42 the inner diameter of the coils are expanded to their original diameter which was reduced during bundling. When the mandrel is full the flyer unit and end bell assembly 88 are mounted by moving the tube 82 into the collar 40 with the eccentric portions 76 of the adapters 70 in alignment with openings 122. The unit is then turned clockwise to lock the plates 92 and 96 between the portions 76 and collar 40. Wire is threaded from the bundles through guide hole 126 in flyer 114 through wire guide 80, delivery tube 36, and over a tension device (not shown) which is not part of the pay-off reel. The needle valve of pump 30 is opened to release fluid from cylinder 18, thus allowing the mandrel 8 to pivot about pin 16 until its left hand end is depressed below the horizontal to the position shown in broken lines in Figure 1. The angle of depression may be 15° or less. The coils of wire tend to slide to the front of the mandrel and as the wire is pulled from the mandrel the expansion action of spokes 94 keeps the convolutions of wire from tangling. The flyer 114 will rotate as the wire is pulled off and adjustment of tension of brake assembly by means of nut 102 will prohibit the flyer 114 from advancing with respect to the position of pay-off of each convolution of wire. The secondary function of the brake adjustment is to partially control spooling tension of the wire. Tightening of nut 102 causes compression of spring 104 forcing the spring seat 106 against pins 110, thus forcing the brake lining 112 against the end bell plate 90.

While one embodiment of our invention has been shown and described it will be apparent that other adaptations and modifications may be made without departing from the scope of the following claims.

We claim:

1. A generally horizontal pay-off reel for bundles of wire comprising a hollow mandrel for supporting coils of wire, said mandrel including a tube, a radial plate mounted on said tube adjacent a first end thereof, a radial plate mounted on said tube adjacent the second end thereof and a plurality of spaced apart spokes extending between and secured to said plates, said spokes being generally parallel to the axis of said tube over a substantial length thereof from the first named plate and converging inwardly adjacent the second end of said mandrel, an end bell attached to the second end of said tube, said end bell including a third plate at its end remote from said first plate and a plurality of spaced apart spokes attached to said last named plate extending radially inwardly toward the first named plate between the first named spokes, a flyer rotatably mounted adjacent said third plate, a pivot mounting adjacent the first end of the mandrel for supporting said mandrel for limited movement in a vertical plane, and means for moving said mandrel about said pivot, said moving means including means for preventing movement of the mandrel.

2. A generally horizontal pay-off reel for bundles of wire comprising a hollow mandrel for supporting coils of wire, said mandrel including a tube, a radial plate mounted on said tube adjacent a first end thereof, a radial plate mounted on said tube adjacent the second end thereof and a plurality of spaced apart spokes extending between and secured to said plates, said spokes being generally parallel to the axis of said tube over a substantial length thereof from the first named plate and converging inwardly adjacent the second end of said mandrel, an end bell attached to the second end of said tube, said end bell including a third plate at its end remote from said first plate and a plurality of spaced apart spokes attached to said last named plate extending radially inwardly toward the first named plate between the first named spokes, an entry guide supported by said end bell, a flyer rotatably mounted on said entry guide, a pivot mounting adjacent the first end of the mandrel for supporting said mandrel for limited movement in a vertical plane, and means for moving said mandrel about said pivot.

3. A generally horizontal pay-off reel for bundles of wire comprising a hollow mandrel for supporting coils of wire, said mandrel including a tube, a radial plate mounted on said tube adjacent a first end thereof, a radial plate mounted on said tube adjacent the second end thereof and a plurality of spaced apart spokes extending between and secured to said plates, said spokes being generally parallel to the axis of said tube over a substantial length thereof from the first named plate and converging inwardly adjacent the second end of said mandrel, an end bell attached to the second end of said tube, said end bell including a third plate at its end remote from said first plate and a plurality of spaced apart spokes attached to said last named plate extending radially inwardly toward the first named plate between the first named spokes, an entry guide supported by said end bell, a flyer rotatably mounted on said entry guide, a pivot mounting adjacent the first end of the mandrel for supporting said mandrel for limited movement in a vertical plane, a hydraulic cylinder and piston, a support for said pivot mounting, a pivot attachment between said mandrel and one end of said cylinder and piston, and a pivot attachment between said support and the other end of said cylinder and piston.

References Cited in the file of this patent

UNITED STATES PATENTS

| | | |
|---|---|---|
| 1,515,682 | Hughes | Nov. 18, 1924 |
| 1,538,477 | Epstein | May 19, 1925 |
| 1,966,532 | Williams | July 17, 1934 |
| 2,102,610 | Blashill | Dec. 21, 1937 |
| 2,188,358 | Kilmer | Jan. 30, 1940 |
| 2,391,321 | Littell | Dec. 18, 1945 |
| 2,755,033 | Anderson | July 17, 1956 |
| 2,762,583 | Lenk | Sept. 11, 1956 |